US012561215B2

(12) United States Patent
Cepek et al.

(10) Patent No.: US 12,561,215 B2
(45) Date of Patent: Feb. 24, 2026

(54) GRAPH MACHINE LEARNING FOR CASE SIMILARITY

(71) Applicant: Oracle International Corporation, Redwood Shores, CA (US)

(72) Inventors: Miroslav Cepek, Prague (CZ); Iraklis Psaroudakis, Zurich (CH); Rhicheek Patra, Zurich (CH); Timothy Trovatelli, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/740,689

(22) Filed: Jun. 12, 2024

(65) Prior Publication Data

US 2024/0330130 A1 Oct. 3, 2024

Related U.S. Application Data

(63) Continuation of application No. 17/577,711, filed on Jan. 18, 2022, now Pat. No. 12,050,522.

(51) Int. Cl.
| | |
|---|---|
| *G06F 11/14* | (2006.01) |
| *G06N 3/04* | (2023.01) |
| *G06V 30/18* | (2022.01) |

(52) U.S. Cl.
CPC ........... *G06F 11/1476* (2013.01); *G06N 3/04* (2013.01); *G06V 30/18181* (2022.01)

(58) Field of Classification Search
CPC ....... G06F 11/14; G06F 11/1476; G06N 3/04; G06N 3/045; G06N 20/00; G06N 5/022; G06V 30/18; G06V 30/18181
See application file for complete search history.

(56) References Cited

U.S. PATENT DOCUMENTS

| | | | |
|---|---|---|---|
| 7,388,988 B2 * | 6/2008 | Luo | .......................... G06T 9/20 |
| | | | 382/199 |
| 9,489,754 B2 * | 11/2016 | Arikan | ............... G01C 21/3878 |

(Continued)

FOREIGN PATENT DOCUMENTS

| | | | | |
|---|---|---|---|---|
| CN | 108520275 A | * | 9/2018 | ........... G06N 3/0418 |
| CN | 112528845 A | * | 3/2021 | ......... G06F 18/2414 |

(Continued)

OTHER PUBLICATIONS

Dowloaded 2021: https://stats.stackexchange.com/questions/518841/can-the-k-nearest-neighbor-algorithm-tell-you-how-many-clusters-there-are-among (2 pages).

(Continued)

*Primary Examiner* — Stephen R Koziol
*Assistant Examiner* — Benedict E Lee
(74) *Attorney, Agent, or Firm* — Hickman Becker Bingham Ledesma LLP

(57) ABSTRACT

Herein is machine learning for anomalous graph detection based on graph embedding, shuffling, comparison, and unsupervised training techniques that can characterize an unfamiliar graph. In an embodiment, a computer obtains many known vectors that respectively represent known graphs. A new vector is generated that represents a new graph that contains multiple vertices. The new vector may contain an arithmetic aggregation of vertex vectors that respectively represent multiple vertices and/or a vector that represents a virtual vertex that is connected to the multiple vertices by respective virtual edges. In the many known vectors, some similar vectors that are similar to the new vector are identified. The new graph is automatically characterized based on a subset of the known graphs that the similar vectors represent.

20 Claims, 7 Drawing Sheets

1. Pass data to ML algorithm

Case graphs with edge and node properties in DB

ML model learning embeddings from case graphs

2. Outputs embeddings with similar case graphs groupped

Embeddings of case graphs

Compare past case embedding with the new case embeddings

4. Produce case graph's embedding without retraining

3. Pass new case graph to model to generate its embedding

Embedding new case graph

Trained ML model

Unobserved case graph

5. Yield cases that are similar

Similar historical case graphs

(56)  References Cited

U.S. PATENT DOCUMENTS

|  |  |  |  |  |
|---|---|---|---|---|
| 9,516,053 | B1 * | 12/2016 | Muddu | G06V 10/225 |
| 10,719,779 | B1 * | 7/2020 | Sagduyu | G06F 16/9024 |
| 10,747,740 | B2 * | 8/2020 | Majumdar | G06F 16/9024 |
| 10,929,722 | B2 * | 2/2021 | Cheng | G06F 16/9024 |
| 11,003,717 | B1 * | 5/2021 | Eswaran | G06F 16/21 |
| 11,068,458 | B2 * | 7/2021 | Ibrahim | G06F 16/9024 |
| 11,146,578 | B2 * | 10/2021 | Lem | G06N 5/022 |
| 11,170,048 | B2 * | 11/2021 | Rossi | G06F 16/9024 |
| 11,397,825 | B2 * | 7/2022 | Scheideler | G06F 21/6227 |
| 11,399,037 | B2 * | 7/2022 | Cavallari | G06F 21/552 |
| 12,205,183 | B2 * | 1/2025 | Hiltch | G06Q 50/16 |
| 2018/0041528 | A1 * | 2/2018 | Machlica | G06N 20/00 |
| 2018/0336437 | A1 * | 11/2018 | Cheng | G06F 18/2433 |
| 2019/0132344 | A1 | 5/2019 | Lem | |
| 2019/0340615 | A1 * | 11/2019 | Hanis | G06N 5/02 |
| 2021/0075805 | A1 | 3/2021 | Cavallari | |
| 2021/0124981 | A1 * | 4/2021 | Kim | G06V 10/82 |
| 2021/0125068 | A1 * | 4/2021 | Kim | G06F 18/15 |
| 2021/0264209 | A1 * | 8/2021 | Kim | G06N 3/045 |
| 2021/0373938 | A1 * | 12/2021 | Koupy | G06F 9/4498 |
| 2021/0383067 | A1 * | 12/2021 | Reisswig | G06F 16/367 |
| 2022/0058389 | A1 * | 2/2022 | Seo | G06V 20/13 |
| 2022/0067532 | A1 * | 3/2022 | Lee | G06N 3/09 |
| 2022/0100800 | A1 * | 3/2022 | Georgopoulos | G06N 3/0464 |
| 2022/0138942 | A1 * | 5/2022 | Cho | G06N 3/0464 382/157 |
| 2022/0180512 | A1 * | 6/2022 | Oh | G06N 3/084 |
| 2022/0181006 | A1 * | 6/2022 | Bremer | G06N 20/10 |
| 2022/0245731 | A1 * | 8/2022 | Liu | G06N 3/08 |
| 2022/0414067 | A1 * | 12/2022 | Dai | G06N 3/09 |
| 2024/0062515 | A1 * | 2/2024 | Oh | G06N 3/09 |
| 2024/0256845 | A1 * | 8/2024 | Nurvitadhi | G06N 3/0442 |

FOREIGN PATENT DOCUMENTS

|  |  |  |  |  |  |
|---|---|---|---|---|---|
| CN | 113674385 | A | * | 11/2021 | G06N 3/045 |
| CN | 114205250 | A | * | 3/2022 | G06N 3/044 |
| FR | 2788153 | A1 | * | 7/2000 | H04N 19/30 |
| KR | 20190119469 | A | * | 10/2019 | G06K 9/3258 |
| WO | WO-2017074417 | A1 | * | 5/2017 | G06F 17/10 |
| WO | WO-2018144030 | A1 | * | 8/2018 | G06F 16/00 |

OTHER PUBLICATIONS

Velickovic et al., "Deep Graph Infomax", ICLR 2019, 2018, 17 pages.

Hamilton et al., "Inductive Representation Learning on Large Graphs", 31st Conference on Neural Information Processing Systems (NIPS 2017), 2018, 19 pages.

* cited by examiner

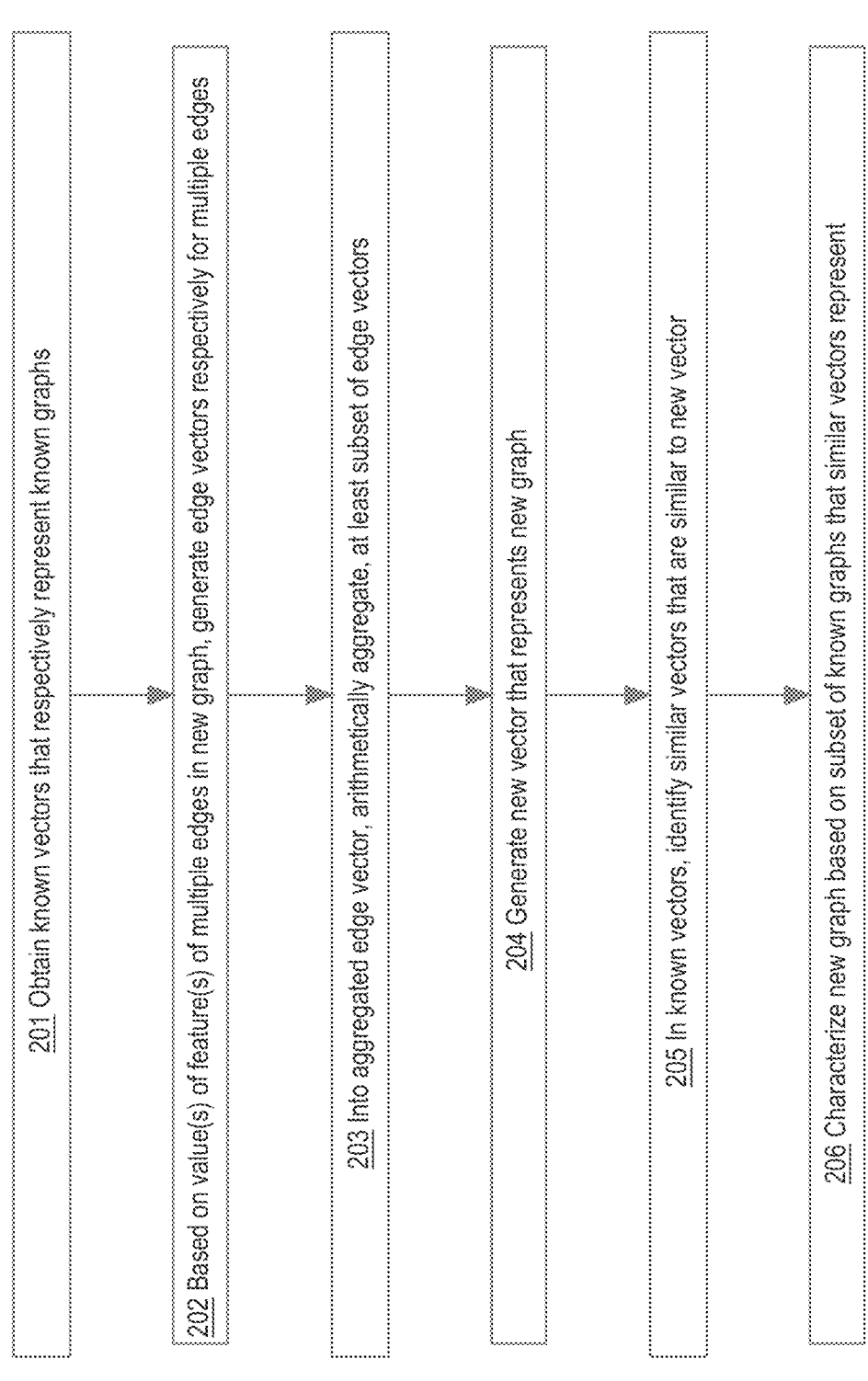

201 Obtain known vectors that respectively represent known graphs

202 Based on value(s) of feature(s) of multiple edges in new graph, generate edge vectors respectively for multiple edges 203 Into aggregated edge vector, arithmetically aggregate, at least subset of edge vectors 204 Generate new vector that represents new graph 205 In known vectors, identify similar vectors that are similar to new vector 206 Characterize new graph based on subset of known graphs that similar vectors represent 401 Unsupervised train weights respectively for features 402 Adjust topology of copy of known graph 403 Generate new graph without virtual vertex 404 To new graph, add virtual vertex that is connected to all other vertices in graph

FIG. 5

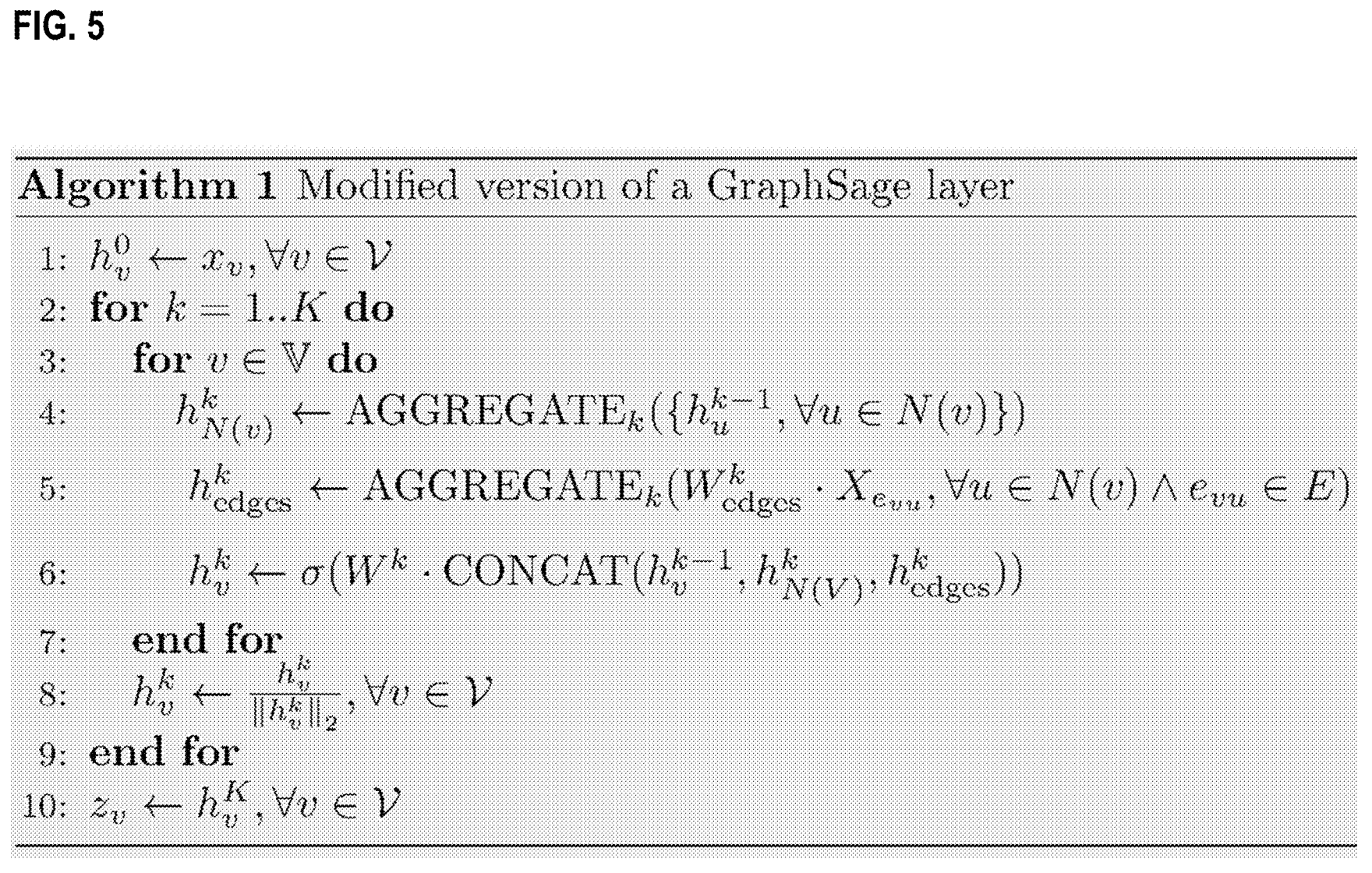

Algorithm 1 Modified version of a GraphSage layer

1: $h_v^0 \leftarrow x_v, \forall v \in V$
2: for $k = 1...K$ do
3:   for $v \in \mathbb{V}$ do
4:     $h_{N(v)}^k \leftarrow$ AGGREGATE$_k(\{h_u^{k-1}, \forall u \in N(v)\})$
5:     $h_{edges}^k \leftarrow$ AGGREGATE$_k(W_{edges}^k \cdot X \cdot e_{vu}, \forall u \in N(v) \wedge u \in N(v) \wedge e_{vu} \in E)$
6:     $h_v^k \leftarrow \sigma(W^k \cdot \text{CONCAT}(h_v^{k-1}, h_{N(v)}^k, h_{edges}^k))$
7:   end for
8:   $h_v^k \leftarrow \frac{h_v^k}{\|h_v^k\|_2}, \forall v \in V$
9: end for
10: $z_v \leftarrow h_v^k, \forall v \in V$

GRAPH MACHINE LEARNING FOR CASE SIMILARITY

BENEFIT CLAIM

This application claims the benefit as a continuation of application Ser. No. 17/577,711, filed Jan. 18, 2022, by Miroslav Cepek et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

RELATED CASE

Incorporated herein by reference in their entirety are the following related references:

U.S. patent application Ser. No. 17/558,342 "INVALID TRAFFIC DETECTION USING EXPLAINABLE UNSUPERVISED GRAPH ML" filed on Dec. 21, 2021 by Valentin Venzin et al.

"Deep Graph Infomax" published in 2019 by Petar Velickovic et al in the International Conference on Learning Representations (ICLR).

FIELD OF THE INVENTION

The present invention relates to machine learning for anomalous graph detection. Herein are graph embedding, shuffling, comparison, and unsupervised training techniques that can characterize an unfamiliar graph.

BACKGROUND

A state of the art anomaly detection application may monitor incoming transactions and apply a predefined set of rules on the transactions. The rules may be as simple as detecting transfers that involve a particular geographic region. There may be more complex rules, like detecting a rapid succession of interactions between a set of accounts. If at least one of the rules is fulfilled, the transactions and connected accounts are turned into a case graph and presented to a human investigator for closer inspection. Presently, the inspection depends solely on the investigator's training and knowledge to determine whether the case is a legitimate activity or problematic behavior and what kind of problematic behavior. Examples of problematic behavior may include network intrusion, account impersonation, fraud, theft, unauthorized activity, and regulatory evasion. Each of the types has some respective characteristics. For an accurate decision, an investigator needs to know all of the characteristics and has to be able to observe them in the data. In turn, it means that the investigation is tedious and time-consuming work requiring considerable expertise. A wrong decision may lead to legal actions against the provider and fines. Thus, providers spend much resources and effort on human training of investigators and maintaining their skills.

BRIEF DESCRIPTION OF THE DRAWINGS

In the drawings:

FIG. 1 is a block diagram that depicts an example computer that uses graph embedding, shuffling, comparison, and unsupervised machine learning (ML) techniques that can be used to characterize a new graph based on comparison of graph vectors;

FIG. 2 is a flow diagram that shows an example characterization process that a computer may perform to characterize a new graph based on comparison of graph vectors;

FIG. 5 shows an example pseudocode algorithm that a computer may perform to generate vertex embedding vectors for a graph such as a new graph or any training graph;

DETAILED DESCRIPTION

Figure 3:
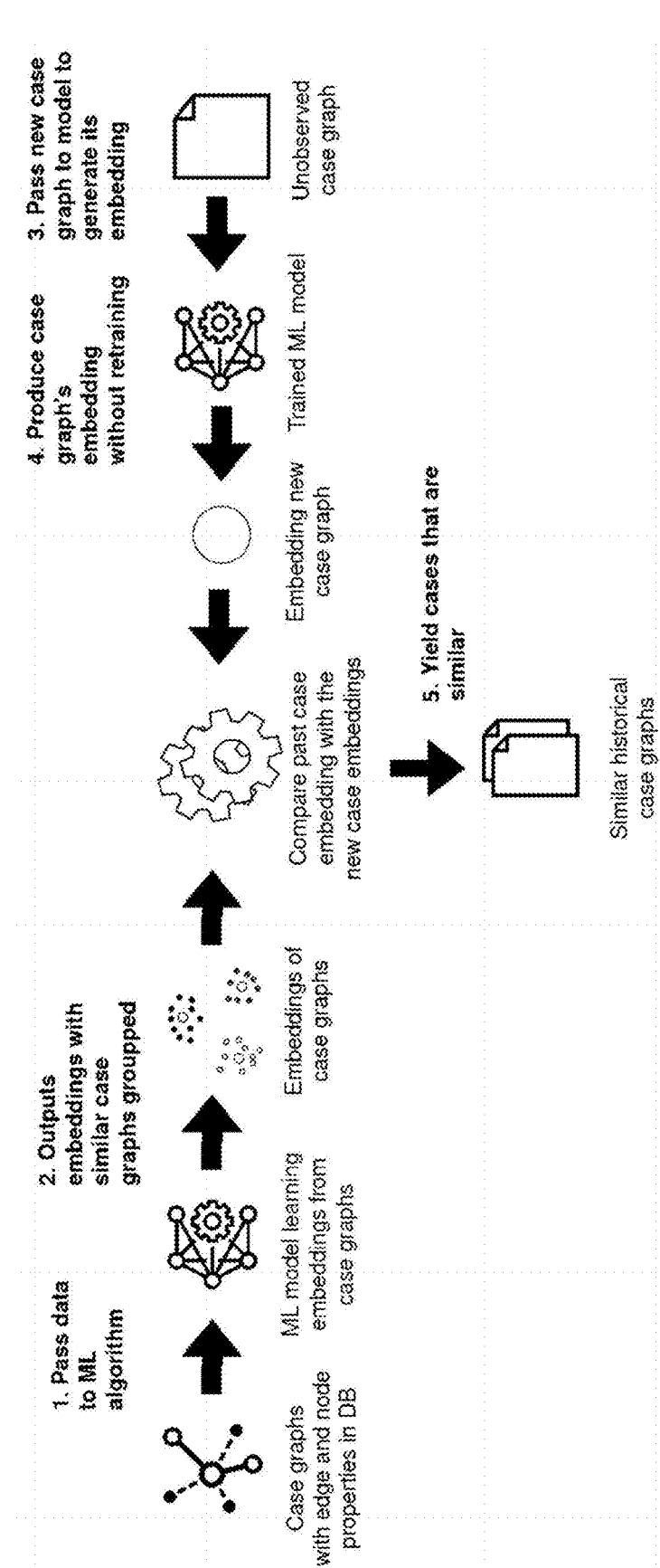
FIG. 3 is a flow diagram that shows an example lifecycle process that a computer may perform to train an unsupervised model and characterize a new graph.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Approaches herein make a forensic decision about a transactional case easier and faster for automation or an investigator and based on past cases for consistency and accuracy. Graph machine learning techniques are used to automatically identify past case graphs that are similar to the present case. The identified similar case graphs may be presented to the investigator along with corresponding case narratives and final decisions taken in the past investigations. The investigator can use these similar cases to speed up the investigation by checking common features of similar past case graphs as well as the decision taken for them.

This approach automates and/or supports investigators in making or approving decisions as to whether a case graph is representative of legitimate activity or suspicious activity that requires further investigation. Techniques herein automatically explore past case graphs and identify the case graphs similar in topology and values to the present case graph under investigation. Graph machine learning is used to generate vector representations of vertices, edges, and/or whole graphs. An improved GraphSAGE algorithm is used to generate the vector representations. GraphSAGE is improved to use edge properties that provide important transactional information for increased accuracy. Herein are two approaches to aggregate vertex and/or edge representations into a single vector that represents the graph. A mean aggregation embodiment may calculate an average of all vertex representations in the case graph. Additionally or instead, a virtual vertex embodiment adds a dummy vertex to the graph and uses the dummy vertex's representation for the case graph vector representation. In both approaches the vector representation is used to identify similar past case graphs.

To facilitate a case graph similarity search among past case graphs, a graph neural network (GNN) model may be used in an embodiment to generate multidimensional vector representations of any case graph. For each case graph, a multidimensional vector maps the graph into a point in a latent or case graph representation space. The GNN model is trained to map graphs similar in structure and vertex/edge properties into a similar location in the latent space. Likewise, dissimilar graphs are mapped far away from each other in the latent space. Once a model with such capabilities has been trained and deployed into production, a similarity search of a case graph can be performed by obtaining all of the embeddings from the historical case graphs, computing the latent representation of the graph queried on demand (e.g. by automation or an investigator), and comparing their graph similarities in the latent space. To measure the distance in the latent space as a proxy for similarity/dissimilarity, a metric such as the cosine or Euclidean distance is used. Similarity distance may be used in automatic characterization approaches such as clustering and/or K nearest neighbors (KNN).

As a representation of a logical graph, a graph vector has increased density and, counterintuitively, without significantly decreased accuracy of characterization. As a dense representation, a graph vector conserves volatile and/or nonvolatile storage space. This density means that more representations may be cached in fast volatile memory, which provides acceleration. Likewise, this density facilitates fitting many graph vectors into limited memory of a hardware accelerator such as a graphical processing unit (GPU) for data parallelism such as vectorization, which provides acceleration. Any of the numeric vector techniques herein may be accelerated by single instruction multiple data (SIMD) such as by offloading to a GPU and by horizontal data partitioning for horizontal scaling such as for a multicore central processing unit (CPU), multiple onboard CPUs, or multiple computers. Accelerated numeric calculations include model training of feature weights, multiplicative application of feature weights, generation of representation vectors of edges and vertices, arithmetic aggregation of representation vectors of connected edges or of neighboring vertices, and generation, comparison, and clustering of graph vectors. Unlike graph comparison and clustering techniques that slowly traverse a graph's sparse topology and data structures and access properties having heterogeneous datatypes, comparison and clustering of dense graph vectors uses homogenous data that is well suited for SIMD. Thus, improvements herein provide acceleration and storage conservation beyond the state of the art.

In an already trained embodiment, a computer obtains many known vectors that respectively represent known graphs. A new vector is generated that represents a new graph that contains multiple vertices. The new vector may contain an arithmetic aggregation of vertex vectors that respectively represent multiple vertices and/or a vector that represents a virtual vertex that is connected to the multiple vertices by respective virtual edges. In the many known vectors, some similar vectors that are similar to the new vector are identified. The new graph is automatically characterized based on a subset of the known graphs that the similar vectors represent.

1.0 Example Computer

Figure 1:
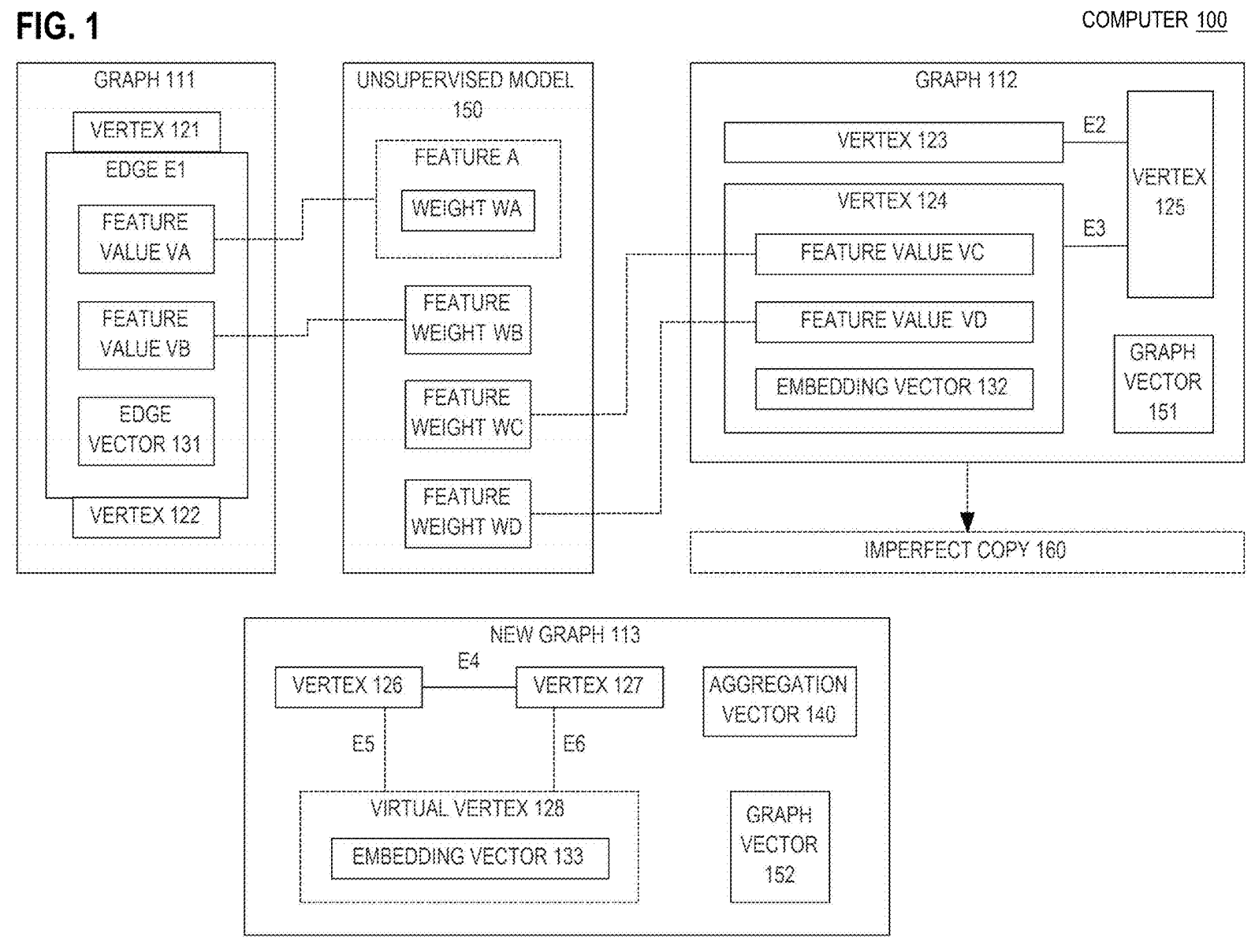

FIG. 1 is a block diagram that depicts an embodiment of an example computer 100 that uses graph embedding, shuffling, comparison, and unsupervised machine learning (ML)

techniques that can be used to automatically characterize an unfamiliar graph such as for anomaly detection. Computer 100 may be one or more of a rack server such as a blade, a personal computer, a mainframe, a virtual computer, a smartphone, or other computing device.

Computer 100 operates in two phases that are training and production. In an embodiment not shown, computer 100 is two computers respectively for training and production. For example, training may occur in a development environment that may be the same or different from a production environment such as in separate datacenters.

1.1 Logical Graphs

During training, computer 100 processes a training corpus of known graphs (i.e. training graphs) 111-112 that are stored in volatile and/or nonvolatile storage that computer 100 contains or accesses. Discussed later herein is new graph 113 that the training corpus does not contain. For example, new graph 113 might not exist during training. However, new graph 113 is based on a same set of data structures as training graphs 111-112. For example, new graph 113 may later be added to the training corpus for retraining.

Each of graphs 111-113 is a logical graph that contains one or more vertices interconnected by one or more edges. For example, graph 111 contains vertices 121-122. Each edge connects exactly two vertices or, if the edge is self-directed (not shown), then only one vertex.

Edges E1-E2 are depicted in different ways for demonstration but are stored and processed in a same way. Although shown as a line, edge E2 has a same internal structure as edge E1 that is shown as a box that contains inner boxes. For example, edges E1-E3 may be stored in a same edge table. Likewise, vertices 123-124 are depicted differently but have a same internal structure. For example, vertices 121-125 may be stored in a same vertex table.

1.2 Features

Each graph may be a property graph such that edges share a same set of edge features and vertices share a same set of vertex features. Each feature may have a respective datatype and a respective value range. In an embodiment, all features are converted to real (e.g. floating point) numbers in a same range such as zero to one (e.g. sigmoid).

Each edge may contain its own value respectively for each edge feature. For example, edge E1 has feature value VA for edge feature A. Likewise, edge E1 has feature value VB for edge feature B (not shown). Although not shown, edges E2-E4 may also contain their own values respectively for edge features A-B.

Computer 100 may treat edges E1-E6 as undirected, even if an edge is directed. In an embodiment, an edge feature may represent an edge property such as direction, type, label, other attribute or, when edges represent respective events, a timestamp. Although not shown, vertex features C-D represent vertex properties. For example, vertex 124 contains feature values VC-VD respectively for vertex features C-D.

1.3 Feature Weight

Edge features A-B and vertex features C-D may have different respective importances for characterizing edges or vertices. For example, edge feature A may reveal much about edges such that feature value VA is correlated with the character of edge E1 itself. Likewise, differences in respective values of edge feature A across multiple edges are correlated with differences in the respective character of those edges.

The importance of a feature is automatically discovered and measured as a trainable weight. For example, feature weight WA measures the importance of edge feature A. Likewise, feature weight WC measures the importance of vertex feature C. Feature A is shown with a dashed outline to indicate that unsupervised model 150 contains only feature weights WA-WD and not other attributes of features A-D such as datatype and range.

Weight training is unsupervised training of model 150 that learns optimal values for feature weights WA-WD. After training, unsupervised model 150 may be persisted solely as an array of feature weights WA-WD. Unsupervised model 150 may also have an unsupervised machine learning (ML) algorithm that is used in training and in production. In an embodiment, the ML algorithm is GraphSAGE that is improved in innovative ways as presented later herein. For example, unsupervised model 150 may be a neural network, a graph neural network (GNN), and/or an improved Graph-SAGE model.

1.4 Representation Vector

Herein, a representation vector is a dense encoding of a graph element such as an edge or vertex. A representation vector of an edge is referred to as an edge vector. A representation vector of a vertex is referred to as an embedding vector or a vertex vector. An edge vector is not an embedding because a vertex has an embedding context and an edge does not, as explained later herein.

The purpose of feature weights is to generate representation vectors that densely represent and characterize respective edges and vertices. For example, edge vector 131 is a representation of edge E1. In an embodiment, edge vector 131 contains a respective real (e.g. floating point) number for each of edge features A-B, and each number is a multiplicative product of a corresponding value and weight of an edge feature. For example, the number in edge vector 131 for feature A may be feature value VA times feature weight WA.

Although not shown, edges E2-E4 also have respective edge vectors. Each of vertices 121-127 may also have a respective vertex embedding vector. For example, vertex 124 has vertex embedding vector 132.

Although vertex embedding vectors and edge vectors may share implementation mechanisms and processing, vertex embedding vectors are not semantically interchangeable with edge vectors. For example, all edge vectors have a same first fixed width (i.e. count of numbers or bytes), and all vertex embedding vectors have a same second fixed width. The first and second fixed widths may be different because: a) there may be different counts of edge features and vertex features and b) edge vectors may be arithmetically aggregated into a vertex embedding vector as presented in related U.S. patent application Ser. No. 17/558,342. Although representation vectors 131-133 are demonstratively shown as inside an edge or vertex, representation vectors may actually be separately stored from the edges and vertices they represent.

As explained above, a representation vector that represents any edge or vertex may be generated by applying feature weights to feature values to calculate numbers that are stored in the representation vector. However, feature weights are trainable and should be automatically learned. During training, feature weights are (e.g. real) non-negative numbers that may initially be random or one.

Initial weights produce inaccurate representation vectors that do not properly characterize edges and vertices because the initial weights do not reflect the discoverable respective importances of features A-D. A loss function may measure how inaccurate is a representation vector and which feature weights should be adjusted by what respective amount such as by backpropagation iterations as discussed later herein.

1.5 Embedding Context

Embedding vector 132 is a contextual embedding of vertex 124. Some or all of graph 112 is the embedding context of vertex 124. Although embedding vector 132 may be primarily based on vertex feature values VC-VD of vertex 124, embedding vector 132 is also based on edges connected to vertex 124 and other vertices within the embedding context of vertex 124.

For example with GraphSAGE, embedding vector 132 is also based on embedding vectors of vertices within a radius of vertex 124. A radius is measured by an edge and a vertex such that a radius of one for vertex 125 includes edges E2-E3 that are connected to vertex 125 and neighboring vertices 123-124 that are connected to edges E2-E3. Each vertex has its own respective embedding context. For example, GraphSAGE may increment a radius of an embedding context to iteratively expand each context based on the radius and the topology of graph 112.

At each iteration, GraphSAGE as improved herein arithmetically aggregates edge vectors of edges that are connected to a vertex and arithmetically aggregates vertex embedding vectors within the radius. For example, a numeric value for feature C in embedding vector 132 may be assigned a distance-weighted average of the numeric values for feature C from all of the vertex vectors within the current radius.

The nearer is a vertex from vertex 124, the earlier is the iteration in which the vertex first becomes included within the expanding radius around vertex 124. Once a vertex enters the radius, that vertex remains in the context for all subsequent iterations. Thus, embedding vectors of nearer vertices contribute to embedding vector 132 in more iterations than do more distant edges and vertices. That difference in participating iterations effectively provides another dimension of weighting such that distant embedding vectors are arithmetically less significant than nearer embedding vectors. Because a vertex is nearest (i.e. zero distance) to itself, the vertex's own embedding vector's initial numeric values may be the most significant in determining the final values in the embedding vector.

1.6 Loss Function

Training may have nested loops. Feature weights WA-WD are adjusted (e.g. by backpropagation) at the end of each iteration of an outer loop. Context radius are incremented (e.g. by one) in each iteration of an inner loop that populates the embedding vectors. During an iteration of the outer loop, the inner loop has a fixed count of iterations that is a predefined maximum radius. When training converges (i.e. finishes), the outer loop ceases iterating, which may occur when loss falls below a first threshold or when the gradient or increment of loss falls below a second threshold. Example loss functions (e.g. for backpropagation) are discussed later herein, and additional loss functions are presented in related U.S. patent application Ser. No. 17/558,342.

The outer loop, loss function, and backpropagation occur only in training. Feature weights WA-WD do not change after training. The inner loop is an embedding loop that occurs in training and in production and uses the feature weights to populate representation vectors.

1.7 Shuffling

In an embodiment during training, the loss function (e.g. for backpropagation) is based on copying a training graph. In an embodiment, training does not randomly walk a training graph nor a copy of the training graph. In an embodiment, the copy of the training graph is imperfect. For example, imperfect copy 160 is generated from graph 112 during training. In an embodiment, the loss function (e.g. for backpropagation) measures loss by comparing graph 112 to imperfect copy 160.

Representing graph 112 is graph vector 151 that contains numbers. An embedding vector and a graph vector have somewhat related semantics. Both are dense representations based on a vector of numbers that represent a feature rich data structure. An embedding vector represents a vertex and the graph element's context such as a subgraph. A graph vector instead represents a whole graph. Comparison of two graphs may be accelerated by instead comparing their respective graph vectors, especially if at least one of the graph vectors is retained from an earlier calculation.

Although not shown, imperfect copy 160 may have its own graph vector. Training loss may be based on a measurement of similarity between the graph vectors of graph 112 and imperfect copy 160. For example if graph 112 and imperfect copy 160 are almost identical, then their graph vectors should be almost identical.

If their graph vectors significantly differ, then training loss is large, which means: a) the embedding vectors of edges and/or vertices that were used to generate the graph vectors are inaccurate, and b) the feature weights used to generate the embedding vectors are inaccurate and should be adjusted based on loss magnitude. For example: a) a graph vector and an embedding vector may contain numbers respectively for edge features and/or vertex features, b) positions in the graph vector or embedding vector correspond to respective features such that c) a number in a graph vector is associated with a number (e.g. in a same or different position) in an embedding vector and both are associated with a same feature, and d) loss may be measured separately for each feature such that respective weights of different features may be differently adjusted.

1.8 Mutual Information

In an embodiment, deep graph InfoMax (DGI) provides the loss function that generates imperfect copy 160 from training graph 112 and compares both graphs based on their graph vectors such as presented in the related "Deep Graph Infomax" reference. Discussed later herein are improved graph vectors that better characterize graphs than graph vectors provided by conventional DGI.

Training is an optimization that minimizes loss that measures a difference between the respective graph vectors of graph 112 and imperfect copy 160. Minimizing loss/difference is semantically the same as maximizing similarity between the graph vectors of graph 112 and imperfect copy 160. DGI calculates mutual information between two graph vectors as a measurement of graph similarity. Mutual information is a statistical metric that provides aspects of entropy and correlation, where correlation is a proxy for similarity. Techniques and mathematical formulae for calculating mutual information between graph vectors of a training graph and its imperfect copy are presented in the related "Deep Graph Infomax" reference.

Imperfect copy 160 may be generated by shuffling as follows. In an embodiment, one or multiple features of one or multiple graph elements (i.e. edge or vertex) are imperfectly copied such that feature value(s) in training graph 112 are replaced with different value(s) in imperfect copy 160 before the graph vector of imperfect copy 160 is generated. In an embodiment, the replacement value is randomly selected from the range of values that are possible for the feature or that actually occur for the feature in any graph in the training corpus. In an embodiment, the feature is randomly selected.

1.9 Graph Vector

After training unsupervised model 150, feature weights WA-WD should not be adjusted and can be used in production to more or less quickly generate representation vectors for edges and vertices of an unfamiliar graph that is not in the training corpus. For example, new graph 113 may be received and characterized more or less in real time such as from a live stream of new graphs. Characterization of a graph may be based on its graph vector. For example, new graph 113 may be characterized as similar or dissimilar to training graph 112 by comparing their graph vectors 151-152 as discussed later herein.

A graph vector is based, in various ways that depend on the embodiment, on the representation vectors of the edges and vertices that occur in a graph. In an embodiment, graph vector 152 may be based on aggregation vector 140 and/or embedding vector 133. Although not shown, graph vector 151 may have a similar basis.

1.10 Virtual Vertex

Depending on the embodiment, only aggregation vector 140 or only embedding vector 133 or both are generated as a basis of graph vector 152 that represents new graph 113. As shown, new graph 113 originally contains vertices 126-127 and edge E4. Virtual vertex 128 and virtual edges E5-E6 are shown with dashed lines to indicate that they are synthetic and added to new graph 113 only if the embodiment uses embedding vector 133 as a basis for graph vector 152.

Aggregation vector 140 may contain a numeric average of the embedding vectors of original vertices 126-127, with averaging occurring separately per number/feature in aggregation vector 140. For example, a first number in aggregation vector 140 may be an average of first numbers in embedding vectors of vertices 126-127. Techniques for aggregating embedding vectors such as by averaging are presented in related U.S. patent application Ser. No. 17/558,342. In an embodiment, graph vector 152 is or contains aggregation vector 140. For example, vectors 140 and 152 are demonstratively shown as separate vectors but may actually be a same vector.

When generating embedding vectors for vertices of new graph 113, virtual vertex 128 is added to new graph 113. Also added to new graph 113 are virtual edges E5-E6 that respectively connect virtual vertex 128 to all original vertices 126-127 in new graph 113. In other words, the embedding context of virtual vertex 128 is the entire new graph 113. Thus, embedding vector 133 that represents virtual vertex 128 also represents new graph 113.

In an embodiment, graph vector 152 is or contains embedding vector 133. For example, vectors 133 and 152 are demonstratively shown as separate vectors but may actually be a same vector. In an embodiment, graph vector 152 contains both of vectors 133 and 140. Regardless of how graph vector 152 is calculated for new graph 113, graph vector 151 is calculated in the same way for training graph 112. For example although not shown, a virtual vertex and virtual edges may be added to training graph 112.

2.0 Example Characterization Process

FIG. 2 is a flow diagram that depicts an example characterization process that computer 100 may perform to characterize new graph 113 based on comparison of graph vectors. FIG. 2 is discussed with reference to FIG. 1.

The process of FIG. 2 occurs in a production environment. In other words, unsupervised model 150 was already trained before the process of FIG. 2. Preparatory step 201 obtains known graph vectors that respectively represent known graphs 111-112. Herein, a training graph may be referred to as a known graph, and a graph vector of a known graph may be referred to as a known graph vector.

However, a graph that is known need not have a training label. For example, the training corpus may or may not be labeled, and known graphs 111-112 may or may not have already been classified as anomalous or non-anomalous. In any case, step 201 may calculate graph vector 151, or graph vector 151 may have been already calculated and retained during training of unsupervised model 150.

Step 202 receives new graph 113 such as from a live stream or on demand. Based on values of edge features A-B of edges 126-127 in new graph 113, step 202 generates respective edge vectors. Depending on the embodiment, step 202 may or may not add virtual vertex 128 and virtual edges E5-E6 to new graph 113.

Step 203 may generate vertex embedding vectors for vertices 126-127 and, in an embodiment, for virtual vertex 128. Step 203 arithmetically aggregates at least a subset of edge vectors of new graph 113 in various ways in various embodiments. For example, edge vectors of edges that are connected to a vertex may be aggregated (e.g. averaged) and concatenated by width into the vertex vector of the vertex as described in related U.S. patent application Ser. No. 17/558, 342. Here and elsewhere herein are various ways of aggregating edges or aggregating vertices to generate a whole or a part of a vector. Those ways produced a whole or partial vector of a fixed width (i.e. count of numbers/features and count of bytes) that does not depend on how many edges or vertices are aggregated.

In an embodiment, embedding vector 133 contains an average of edge vectors of virtual edges E5-E6. In an embodiment, aggregation vector 140 is or contains an aggregation of edge vectors of all original edges (not virtual edges E5-E6) in new graph 113 as calculated by step 203.

In any of various ways presented earlier herein, step 204 generates new graph vector 152 that represents new graph 113. After step 204, computer 100 is ready to begin characterization and/or classification of new graph 113 based on graph vector 152.

With known graph vectors, step 205 identifies similar vectors that are similar to new embedding vector 133. For example, numbers in a graph vector may respectively correspond to features A-D, such that the graph vector may be a point in a multidimensional space whose dimensions are features A-D. That multidimensional space may be (e.g. sparsely) populated by the graph vectors of the training corpus as points in the space.

In an embodiment, step 205 identifies, for new graph vector 152, K nearest neighbors (KNN) in the multidimensional space that are similar known graph vectors as a subset of the training graph vectors. KNN is based on multidimensional distance that may be measured as Euclidian, Mahalanobis, or otherwise.

In an embodiment, step 205 uses clustering instead of or in addition to KNN. For example as presented in related U.S. patent application Ser. No. 17/558,342, step 205 may perform multidimensional clustering to organize graph vectors of the training corpus into two or many clusters. For example, each of features A-D may be a dimension for clustering.

After clustering, step 205 may calculate a multidimensional centroid of each cluster as presented in related U.S.

patent application Ser. No. 17/558,342. For example, numbers in a graph vector may respectively correspond to features A-D, and a respective average value of feature A for all graph vertices in a cluster may be the value of feature A for the centroid.

Whether KNN or clustered, step 205 uses multidimensional distance from new graph vector 152 to identify: a) K nearest neighbors as similar known graph vectors or b) one nearest centroid of a cluster of known graph vectors. Step 206 characterizes new graph 113 based on: a) the subset of known graphs that the KNN similar graph vectors represent or b) the cluster of the nearest centroid. For example, that subset of known graphs may have respective classifications or anomaly scores. For example, step 206 may calculate an average of the anomaly scores or a count (i.e. statistical mode) of a subset of similar known graphs having a most frequent classification within the similar known graphs.

Step 205 may characterize, score, or classify new graph 113 based on automatic or manual techniques or both. For example, an expert may manually analyze the subset of similar known graphs and new graph 113, their topologies, their vertices, their edges, and their properties of vertices and edges to characterize new graph 113. For example, step 205 may entail an automatic preliminary characterization followed by a manual confirmation of the classification. In an embodiment, step 205 classifies new graph 113 as anomalous or non-anomalous.

In an embodiment, step 205 entails automatically or manually detecting that new graph 113 is similar or dissimilar to the subset of similar known graphs. In an embodiment, new graph 113 is classified the same as the subset of similar known graphs are classified if new graph 113 is similar to the subset of similar known graphs. Likewise, if new graph 113 is dissimilar to the subset of similar known graphs, new graph 113 is given a different (e.g. opposite) classification than that of the subset of similar known graphs.

In an embodiment, similarity is measured by average or total multidimensional distance between new graph vector 152 and the graph vectors of the subset of similar known graphs. For example, if the distance is within a threshold, then new graph 113 is similar, but if the threshold is exceeded, then new graph 113 is dissimilar. In an embodiment, new graph 113 is anomalous if dissimilar and non-anomalous if similar.

3.0 Example Lifecycle Process

FIG. 3 is a flow diagram that depicts an example lifecycle process that computer 100 may perform to train unsupervised model 150 and characterize new graph 113 in an embodiment. FIG. 3 is discussed with reference to FIG. 1.

The process of FIG. 3 includes steps 1-5. Steps 1-2 occur during training. Steps 3-5 occur in production. For example, one computer may perform steps 1-2, and a different computer in a different environment may perform steps 3-5.

Step 1 loads the training corpus from database DB. For example, the case graphs of step 1 may be training graphs 111-112 of FIG. 1.

Step 2 trains unsupervised model 150 and generates and clusters graph vectors for training graphs 111-112. For example, the embeddings of case graphs in FIG. 3 may be graph vectors including graph vector 151.

Step 3 receives new graph 113 that may be the unobserved case graph of FIG. 3.

Step 4 generates graph vector 152 for new graph 113. In step 4, already trained unsupervised model 150 generates embedding vectors for the edges and vertices of new graph 113 as needed to generate graph vector 152.

Step 5 performs K nearest neighbor (KNN) to identify similar known graphs. In an embodiment, step 5 limits KNN identification to known graphs whose graphs vectors are in whichever cluster has the centroid nearest to graph vector 152.

4.0 Example Training Process

Figure 4:
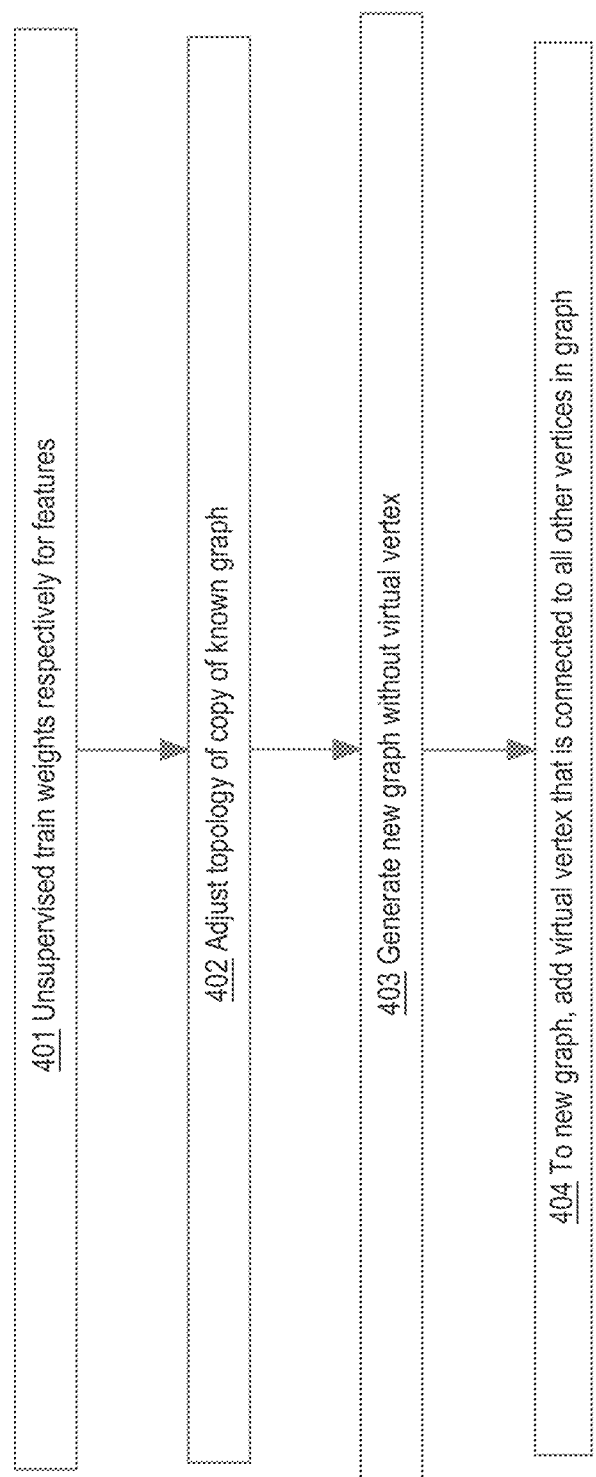
FIG. 4 is a flow diagram that shows an example training process that a computer may perform to train an unsupervised model and generate a graph vector for a new graph.

FIG. 4 is a flow diagram that depicts an example training process that computer 100 may perform to train unsupervised model 150 and generate graph vector 152 for new graph 113 in an embodiment. FIG. 4 is discussed with reference to FIG. 1. The process of FIG. 4 is a demonstrative embodiment based on design choices that are not requirements of other embodiments.

Steps 401-402 occur during training. Steps 403-404 occur in production. For example, one computer may perform steps 401-402, and a different computer in a different environment may perform steps 403-404.

Step 401 unsupervised trains feature weights WA-WD. As discussed earlier herein, unsupervised training may entail generating imperfect copies of training graphs 111-112. In an embodiment, step 401 entails sub-step 402 that adjusts the topology of imperfect copy 160. For example, generation of imperfect copy 160 may entail addition or removal of an edge(s) and/or vertex(s) or may entail moving an edge by disconnecting an edge from either or both of its vertices and reconnecting the edge to one or two other vertices. Although seemingly intensive, such topological changes to imperfect copy 160 still result in a graph vector of a same fixed width for imperfect copy 160 because the width of any graph vector herein does not depend on how many edges or vertices does the graph contain and does not depend on what values do edge properties and vertex properties have.

In production, step 403 generates new graph 113 without virtual vertex 133. Although any graph is self contained, a new graph 113 or any or all training graphs may be generated as subgraphs of a larger graph. For example, the training corpus may contain only one graph, which is huge, and training graphs 111-112 may be distinct subgraphs of that huge graph.

Likewise, new graph 113 may be a distinct subgraph of the huge training graph or of a huge production graph. For example, either of vertex 126 or 127 or edge E4 may be dynamically selected, identified, or created in real time or on demand, which may cause new graph 113 to be extracted in step 403 as a subgraph of a huge graph. For example if edges represent respective events, than a live event may cause: a) creation of new edge E4 in a huge graph and b) extraction of new graph 113 as a subgraph of the huge graph. For example, even though edge E4 and subgraph 113 may be new does not mean that vertices 126-127 are new.

Heuristics for generating a subgraph from a huge graph may entail any of: a) (e.g. random) selection of a starting vertex, b) random walking, c) a subgraph radius or diameter, (e.g. random) subsampling of edges, and/or branching factor(s) for fanout. For example: a) all subgraphs may have a radius of two and a respective starting vertex that is randomly selected, b) a first branching factor of three causes three of the starting vertex's edges to be randomly selected for inclusion in the subgraph along with the neighbor vertices that those edges connect, b) a second branching factor of two causes two of each neighbor vertex's edges to be randomly selected for inclusion in the subgraph along with the neighbor vertices that those edges connect, and c)

an edge should not be selected twice for inclusion in a same subgraph. Thus, that subgraph would have at most ten vertices.

To new graph 113, step 404 adds virtual vertex 128 and virtual edges E5-E6 that respectively connect to all other vertices in new graph 113. Although step 404 makes virtual vertex 128 fully connected to all vertices in new graph 113, that does not mean that new graph 113 itself becomes fully connected. For example if new graph 113 contained at least one original vertex that was not connected to all other original vertices, then addition of virtual vertex 128 and virtual edges E5-E6 would not cause that original vertex to become fully connected to all other original vertices.

5.0 Example Embedding Pseudocode

FIG. 5 depicts example pseudocode algorithm 1 that computer 100 may perform to generate vertex embedding vectors for a graph such as new graph 113 or any of training graphs 111-112. FIG. 5 is discussed with reference to FIG. 1.

In algorithm 1, the following terms have the following meanings.

V is all vertices in the graph, and v is any one of those vertices.

$x_v$ is values of vertex features C-D for vertex v.

$h_v^0$ is the initialization (i.e. iteration zero) of the vertex embedding vector for vertex v.

k is a current embedding iteration (i.e. current context radius), and K is a maximum iteration/radius.

N(v) is all neighboring vertices of vertex v, and u is any one of those neighbor vertices. Although the context/radius incrementally expands, the neighbors always are only vertices directly connected (i.e. distance of one) to vertex v.

$h_u^{k-1}$ is the vertex embedding vector for neighbor u in the previous iteration.

Aggregate( ) is an arithmetic aggregation (e.g. average) on a per-feature basis. Aggregate( ) accepts multiple vectors having a same width (i.e. count of features/numbers and count of bytes) and generates and returns an aggregate vector of the same width.

E is all edges in the graph, and $e_{vu}$ is an edge that connects vertices u-v.

$X_{evu}$ is values of edge features A-B for edge $e_{vu}$.

$W_{edges}^k$ are edge feature weights WA-WB in the current iteration. For example during training, weights may iteratively evolve.

Concat( ) concatenates by width, for vertex v, the aggregate of vertex vectors of neighbor vertices of vertex v and the aggregate of edge vectors of edges connected to vertex v $W^k$ are vertex feature weights WC-WD in the current iteration. For example during training, weights may iteratively evolve.

$\|\|_2$ is Euclidian norm (i.e. multidimensional Euclidian distance).

$z_v$ is the final vertex embedding vector of vertex v such as vertex embedding vector 132 or 133, which is available when iteration ceases.

In algorithm 1, pseudocode lines 1-10 use the above terms as follows. Line 1 initializes the vertex embedding vectors of all vertices in the graph based on vertex features C-D of each vertex. Line 2 loops (i.e. iterates) to incrementally expand the current radius for all vertex contexts. Line 3 (e.g. concurrently) processes each vertex, which includes performing lines 4-6 that generate representation vectors for edges and vertices. In other words, representation vectors for all edges and/or vertices may be concurrently generated.

Line 4 aggregates the previous iteration's embedding vectors of neighbor vertices to calculate the current iteration's embedding vector for vertex v. Even though only neighbor vertices (i.e. distance of one) are directly involved with line 4, there may have been multiple previous iterations that have effectively propagated feature information from vertices beyond a distance of one, including up to the current radius/context.

Line 5 uses current edge feature weights WA-WB to generate/regenerate and aggregate vectors for edges.

Line 6 overwrites the previous iteration's embedding vector for vertex v, such as vertex embedding vector 132 or 133.

Line 8 performs Euclidian normalization of the vertex embedding vectors.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
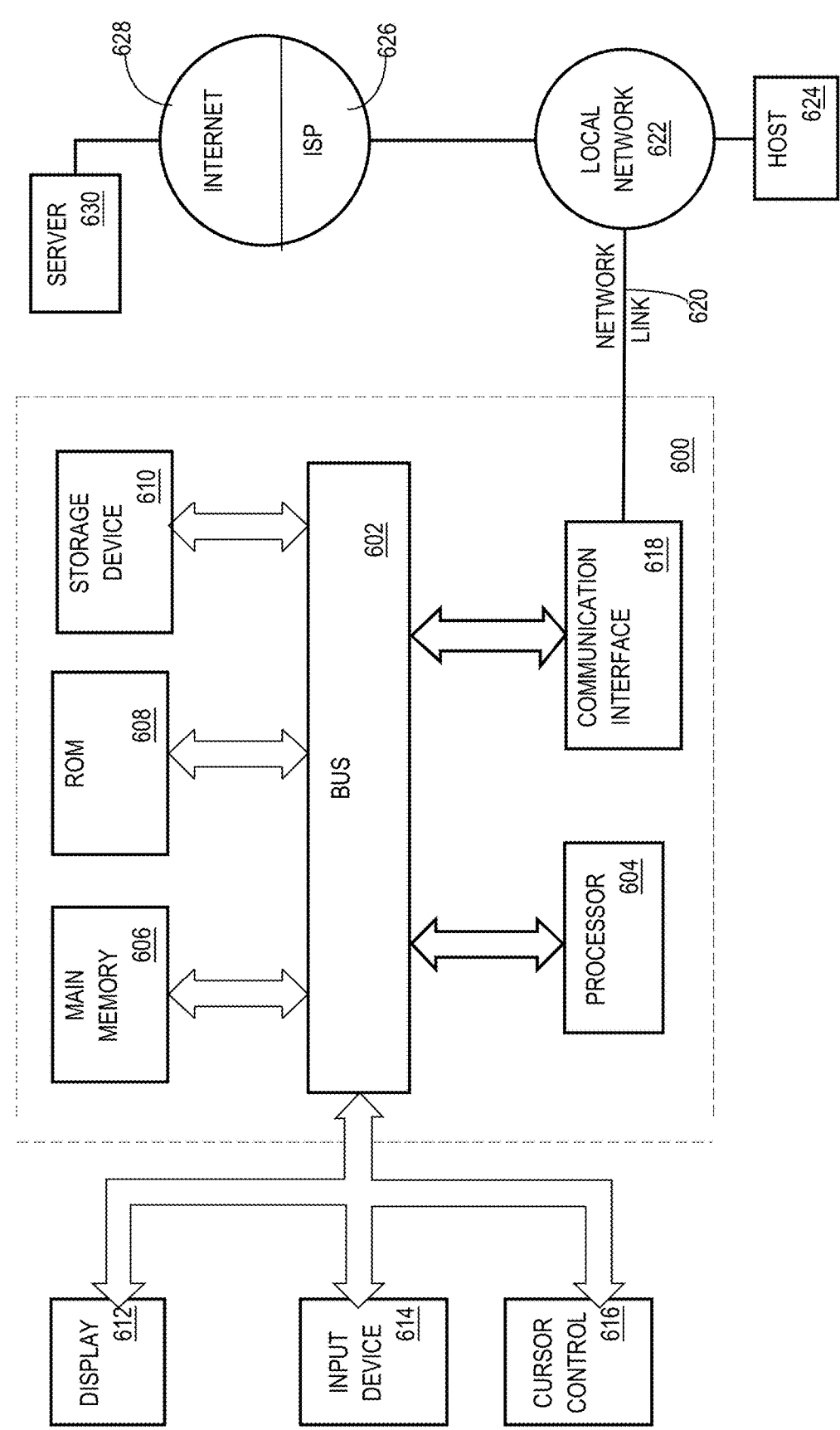
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
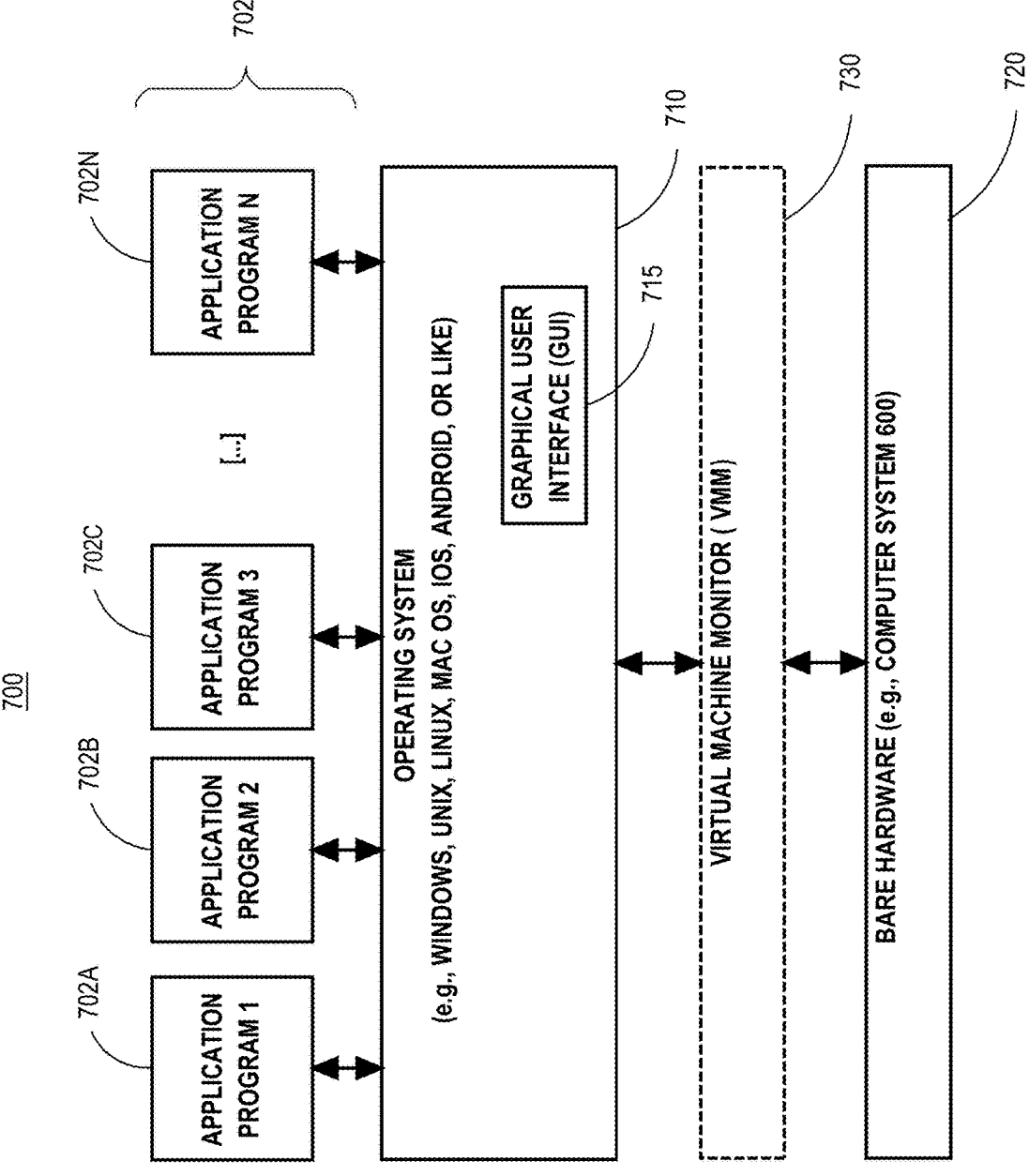
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction loss is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a graph that contains: a plurality of vertices and an edge that connects two vertices of the plurality of vertices;
   performing after said receiving:
      generating and inserting a synthetic vertex into the graph, and
      connecting the synthetic vertex to each vertex in the plurality of vertices;
   generating, based on the synthetic vertex and a fixed-width encoding that represents an edge in the graph, a fixed-width encoding that represents the graph; and
   detecting, based on the fixed-width encoding that represents the graph, that the graph is anomalous.

2. The method of claim 1 wherein said detecting comprises comparing the fixed-width encoding that represents the graph to a fixed-width encoding that represents a second graph.

3. The method of claim 2 wherein said comparing comprises measuring a distance between the fixed-width encoding that represents the graph and the fixed-width encoding that represents the second graph.

4. The method of claim 3 wherein said detecting comprises the distance exceeding a threshold.

5. The method of claim 2 further comprising selecting, based on k nearest neighbors (KNN), the fixed-width encoding that represents the second graph.

6. The method of claim 5 wherein said detecting comprises averaging anomaly scores of said k nearest neighbors.

7. The method of claim 1 wherein:
   the method further comprises generating a fixed-width encoding that represents a particular vertex in the plurality of vertices;
   the fixed-width encoding that represents the particular vertex has a same size as the fixed-width encoding that represents the graph.

8. The method of claim 1 wherein:
   the method further comprises generating the fixed-width encoding that represents the edge in the graph;
   the fixed-width encoding that represents the edge has a different size than the fixed-width encoding that represents the graph.

9. The method of claim 1 further comprising:

generating, based on a count of vertex features, a fixed-width encoding that represents a particular vertex in the plurality of vertices;

generating, based on a count of edge features that is different from the count of vertex features, the fixed-width encoding that represents the edge in the graph.

10. The method of claim 1 further comprising:

generating, based on a plurality of edge features, the fixed-width encoding that represents the edge in the graph;

generating, based on the fixed-width encoding that represents the edge, a fixed-width encoding that represents a particular vertex in the plurality of vertices.

11. One or more non-transitory computer-readable media storing instructions that, when executed by one or more processors, cause:

receiving a graph that contains: a plurality of vertices and an edge that connects two vertices of the plurality of vertices;

performing after said receiving:

generating and inserting a synthetic vertex into the graph, and connecting the synthetic vertex to each vertex in the plurality of vertices;

generating, based on the synthetic vertex and a fixed-width encoding that represents an edge in the graph, a fixed-width encoding that represents the graph; and detecting, based on the fixed-width encoding that represents the graph, that the graph is anomalous.

12. The one or more non-transitory computer-readable media of claim 11 wherein said detecting comprises comparing the fixed-width encoding that represents the graph to a fixed-width encoding that represents a second graph.

13. The one or more non-transitory computer-readable media of claim 12 wherein said comparing comprises measuring a distance between the fixed-width encoding that represents the graph and the fixed-width encoding that represents the second graph.

14. The one or more non-transitory computer-readable media of claim 13 wherein said detecting comprises the distance exceeding a threshold.

15. The one or more non-transitory computer-readable media of claim 12 wherein the instructions further cause selecting, based on k nearest neighbors (KNN), the fixed-width encoding that represents the second graph.

16. The one or more non-transitory computer-readable media of claim 15 wherein said detecting comprises averaging anomaly scores of said k nearest neighbors.

17. The one or more non-transitory computer-readable media of claim 11 wherein:

the instructions further cause generating a fixed-width encoding that represents a particular vertex in the plurality of vertices;

the fixed-width encoding that represents the particular vertex has a same size as the fixed-width encoding that represents the graph.

18. The one or more non-transitory computer-readable media of claim 11 wherein:

the instructions further cause generating the fixed-width encoding that represents the edge in the graph;

the fixed-width encoding that represents the edge has a different size than the fixed-width encoding that represents the graph.

19. The one or more non-transitory computer-readable media of claim 11 wherein the instructions further cause:

generating, based on a count of vertex features, a fixed-width encoding that represents a particular vertex in the plurality of vertices;

generating, based on a count of edge features that is different from the count of vertex features, the fixed-width encoding that represents the edge in the graph.

20. The one or more non-transitory computer-readable media of claim 11 wherein the instructions further cause:

generating, based on a plurality of edge features, the fixed-width encoding that represents the edge in the graph;

generating, based on the fixed-width encoding that represents the edge, a fixed-width encoding that represents a particular vertex in the plurality of vertices.

* * * * *